United States Patent [19]

Rosenberg et al.

[11] Patent Number: 5,994,660
[45] Date of Patent: Nov. 30, 1999

[54] HIGH POWER X-RAY WELDING OF METAL-MATRIX COMPOSITES

[75] Inventors: Richard A. Rosenberg, Naperville; George A. Goeppner, Orland Park; John R. Noonan, Naperville; William J. Farrell, Flossmoor; Qing Ma, Westmont, all of Ill.

[73] Assignee: U.S. Department of Energy, Washington, D.C.

[21] Appl. No.: 08/974,167

[22] Filed: Nov. 19, 1997

[51] Int. Cl.$^6$ ...................................................... B23K 28/00
[52] U.S. Cl. ............................................ 219/121.11; 378/1
[58] Field of Search ................................ 219/121.11, 136, 219/137 R, 137 WM; 378/1; 148/525, 565; 427/551, 552, 595

[56] References Cited

U.S. PATENT DOCUMENTS

| 4,444,599 | 4/1984 | Ikeya | 148/565 X |
|---|---|---|---|
| 4,625,095 | 11/1986 | Das | 219/137 WM |
| 4,672,164 | 6/1987 | Devletian | 219/137 R X |
| 4,803,334 | 2/1989 | Burke et al. | 219/121.64 |
| 4,929,402 | 5/1990 | Hull | 427/551 X |
| 5,486,223 | 1/1996 | Carden | 75/244 |

FOREIGN PATENT DOCUMENTS 6-79485  3/1994  Japan .

OTHER PUBLICATIONS

R. Rosenberg, W. Farrell, Q. Ma, D. Mancini, A. Khounsary, and A. Sheng, E. Crozier, G. Soerensen, R. Gordon, D. Jiang, "Prospects for Using High Power X-Rays as a Volumetric Heat Source," Proceedings of SPIE, Annual Meeting, San Diego, California, Jul. 27, 1997 to Aug. 1, 1997.

R. Rosenberg, Q. Ma, W. Farrell, M. Keefe, and D. Mancini, "X-Ray Welding of Metal-matrix Composites," Rev. Sci. Instrum. 68 (6) p. 2550, Jun. 1997.

E. Crozier, G. Soerensen, T. Tiedge, and T. Troczynski, Thermal Studies of Ceramics, 1994 Activity Report, Stanford Synchrotron Radiation Laboratroy.

*Primary Examiner*—Gregory Mills
*Attorney, Agent, or Firm*—Lisa M. Soltis; Daniels D. Park; William R. Moser

[57] ABSTRACT

A method for joining metal-matrix composites (MMCs) by using high power x-rays as a volumetric heat source is provided. The method involves directing an x-ray to the weld line between two adjacent MMCs materials to create an irradiated region or melt zone. The x-rays have a power density greater than about $10^4$ watts/cm$^2$ and provide the volumetric heat required to join the MMC materials. Importantly, the reinforcing material of the metal-matrix composites remains uniformly distributed in the melt zone, and the strength of the MMCs are not diminished. In an alternate embodiment, high power x-rays are used to provide the volumetric heat required to weld metal elements, including metal elements comprised of metal alloys. In an alternate embodiment, high power x-rays are used to provide the volumetric heat required to weld metal elements, including metal elements comprised of metal alloys.

11 Claims, 5 Drawing Sheets

HIGH POWER X-RAY WELDING OF METAL-MATRIX COMPOSITES

The United States Government has rights in this invention pursuant to Contract Number W-31-109-ENG-38 between the United States Department of Energy and The University of Chicago, as operator of.

TECHNICAL FIELD

The present invention relates to x-ray welding, and, in particular, a method for using high power x-rays as a volumetric heat source for welding metal-matrix composites.

BACKGROUND OF INVENTION

Metal-matrix composites (MMCs) are composed of a metal and a reinforcing material distributed within the metal. The metal matrix is usually comprised of titanium (Ti) or aluminum (Al), and the reinforcing material is usually comprised of alumina ($Al_2O_3$) or silicon carbide (SiC), in the form of particulates, whiskers, wires, fibers, or flakes. MMCs are lighter and have superior mechanical and thermal properties than the metals comprising the matrix alone, including higher specific strength, operating temperature, and wear resistance. MMCs are increasingly important in a growing number of applications, including use in the aerospace industry, high speed mechanical systems, and electronic packaging. The potential use of MMCs, however, is largely unrealized because MMC elements must be joined together to produce integrated structures, and methods for joining MMC elements by autogenous welding have been largely unsuccessful.

Welding technology has developed according to new sources of thermal energy required for directed, localized heating and melting. For example, electrical energy made available the electric arc for welding applications, with attendant improvements including gas tungsten arc (GTA), gas metal arc (GMA), and submerged-arc welding. A major problem associated with using conventional electric arc welding for joining MMCs is that chemical and metallurgical reactions occur between the metal matrix and the reinforcing material, causing brittle and excessively porous welds having poor structural strength. For example, attempts to fusion weld MMCs reinforced with SiC cause undesirable, irreversible chemical reactions rendering the joints unusable.

Electron beam welding tightly focuses an electron beam to effectively drill a hole through the thickness of the target material, permitting single pass and deep penetrating welds. In the deep penetrating welding process, a beam of relatively high velocity electrons (50 KeV to 150 KeV) is directed at the joint to be welded. The beam is focused to produce a power density of about $10^6$ watts/cm$^2$ at the target surface, superheating the surface layers of the work piece and causing violent vaporization, particularly in the central region of the beam, whereby a slightly conical hole, referred to as a keyhole, is bored through the thickness of the material to be welded. The keyhole, having a diameter usually slightly less than the beam diameter, is filled with products of the fusion, evaporation, and sublimation process. Thermal interaction of the metal being welded by relative beam movement occurs at the front wall of the vapor-gas channel (the keyhole), and molten metal moves from the front wall, along the channel walls, and to the rear of the keyhole, due to the dynamic balance between the pressure of gases, vapors, and molten metal. Provided the established conditions produces a stable keyhole, a high quality, full penetration welded joint is produced. A lower quality, or slightly defocused, electron beam at a specific power of about $10^4$ watts/cm$^2$ behaves similarly to a GTA weld, i.e. penetration is limited by heat conductance into the thickness of the metal from the heat area on the surface.

Conditions of laser beam energy sources are similar to the electron beam sources, however, the specific energy of the laser beam must be greater than about $5 \times 10^6$ watts/cm$^2$ to produce a keyhole, due to lower coupling efficiency of the laser beam, as well as metallurgical reactions of the molten metal and the atmosphere. $CO_2$ lasers are used for welding thin sheet metal components because of the high welding speed made possible by the high power of the focused laser beam. However, as the thickness of the welding joint increases, a gas plume forms from metal vaporized by the high intensity beam. The metal vapor is ionized due to laser irradiation which obstructs the beam transfer into the weld pool. A jet of helium gas must be used to blow the plume away from the work surface. Alternatively, laser beam welding is conducted in a vacuum where the metal vapor expands so rapidly that no blocking plume can form.

All energy sources currently utilized for fusion welding, including oxy-fuel, electric arc, GTA, GMA, plasma arc, electron beam, and laser energy sources, essentially depend on surface heating and the resultant conductive heat flow for penetration of the melt into the thickness of the weld. A relatively large temperature difference must be created between the face and root of the weld in order to achieve full penetration, and, therefore, the surface layer of the melt is superheated. Subjecting the surface layer of MMCs to superheating causes melting and vaporization of the reinforcement material, destroying or decreasing the strength of the MMCs. Thus, conventional fusion welding processes cause pronounced changes in the distribution of the reinforcement material of the MCCs in the solidified weld metal. For example, for an MCC reinforced with $Al_2O_3$ material, fusion welding results in a joint strength essentially equivalent to the unreinforced aluminum matrix alloy.

A need still exists in the art for a method of directed, localized heating for welding metal-matrix composites, without excessive melting and/or vaporization.

The development of synchrotron radiation sources has made high energy x-rays available as a volumetric heat source for material processing. In contrast to conventional welding methods, the photons of the x-ray beam penetrate the complete thickness of the work piece, nearly instantaneously heating the volume through which they pass. Thus, the surface layers of the work piece are not subjected to superheating. High energy x-rays have the ability to penetrate deeply into light alloys at selected power densities, without causing violent vaporization and/or holes in the target material. The absorption coefficient of x-rays are atom and energy dependent, and therefore the behavior of the target material exposed to x-rays is vastly different than the behavior of the same material subjected to electron or laser irradiation.

The present method uses x-rays having relatively short wave lengths, such as 1–8 Angstroms, and a relatively high energy power, such as $10^5$ watts/cm$^2$, to weld metal-matrix composites. A high power x-ray is directed to the weld line between two adjacent MMCs materials, generating an irradiated region or melt zone. The metal matrices are fused together in the melt zone, while the reinforcing material of the metal-matrix composites is not vaporized, but remains uniformly distributed in the melt zone. In an alternate embodiment, high power x-rays are used to provide the volumetric heat required to weld metal elements, including metal elements comprised of metal alloys.

Therefore, in view of the above, a basic object of the present invention is to provide a method for welding metal matrix composites, metals, and metal alloys.

Another object of this invention is to provide a method for welding that penetrates deep into a metal matrix composite without causing vaporization of the reinforcement material.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

The present method uses high power x-rays as a volumetric heat source for welding metal-matrix composites.

Briefly, the method provides for welding metal-matrix composites (MMCs) by directing an x-ray to the weld line between two adjacent MMCs materials to melt the matrices. The x-rays have a power density greater than about $10^4$ watts/cm$^2$ and provide the volumetric heat required to join the MMC materials. Importantly, the reinforcing material of the metal-matrix composites remains uniformly distributed in the irradiated region, and the strength of the MMC is not diminished. In an alternate embodiment, high power x-rays are used to provide the volumetric heat required to weld metal elements, including metal elements comprised of metal alloys.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention is a method for using high power x-rays as a volumetric heat source for welding metal-matrix composites (MMCs).

MMCs are composed of a metal and a reinforcing material distributed within the metal, wherein the metal matrix is usually comprised of titanium (Ti) or aluminum (Al), and the reinforcing material is usually comprised of alumina (Al$_2$O$_3$) or silicon carbide (SiC), in the form of particulates, whiskers, wires, fibers, or flakes.

High-intensity x-ray synchrotron radiation sources produce high heat-flux x-ray beams having power densities of greater than $10^4$ watts/cm$^2$ which are focusable on a 1–2 mm target. The energies of the x-rays range from about 3 to about 200 keV and have penetration lengths on the order of about 0.001 to about 50 mm for various materials.

The present method uses high power x-rays as a volumetric heat source for welding MMC elements. The method comprises directing x-ray(s) having a power density greater than about $10^4$ watts/cm$^2$ to a weld line between two adjacent MMC elements to melt the matrices. Preferably, the beam power must be sufficiently high for a welding speed of about 15–20 in/min. in a 3.3 mm thick MMC element. The x-rays produce volumetric heating in the melt zone along the weld line, whereby the MMC elements are fused together at the weld line. The x-rays do not cause cracking or destruction of the MMC elements, and importantly, the reinforcing material remains uniformly distributed in the irradiated region or melt zone along the weld line.

Experiments were performed at the Advance Photon Source (APS) at Argonne National Laboratory. The APS is a 7 GeV, third-generation synchrotron radiation source. The insertion device (ID) used in the beamline was a 72-period, 3.3 cm period length undulator capable of reaching a peak magnetic field of 0.849 T when the undulator gap is closed to its minimum setting of 10.5 cm, resulting in a peak x-ray heat flux of approximately 180 W/mm$^2$ at the location of the experiment (30 m from the source), for a storage ring beam current of 100 mA. At the first harmonic energy of 3.2 keV, calculations predict a spot size FWHM of 2.0 mm horizontal and 1.1 mm vertical. As the undulator gap is increased, the energy of the first harmonic increases from 3.2 ke V to 12 ke V at 25 cm, while the peak heat flux decreases to 35 W/mm$^2$.

Al/Al$_2$O$_3$ MMC samples were comprised of a 6061 Al alloy matrix reinforced with 20% calcined Al$_2$O$_3$ powder particulates having an average size of 20.8±6 $\mu$m. The MMC samples were approximately 25×100×3.3 mm in size.

Welds were performed in air by irradiating a spot on the sample for approximately 16 seconds at a storage ring beam current of 91 mA. The x-ray beam was normal to the surface of the sample.

Figure 1:
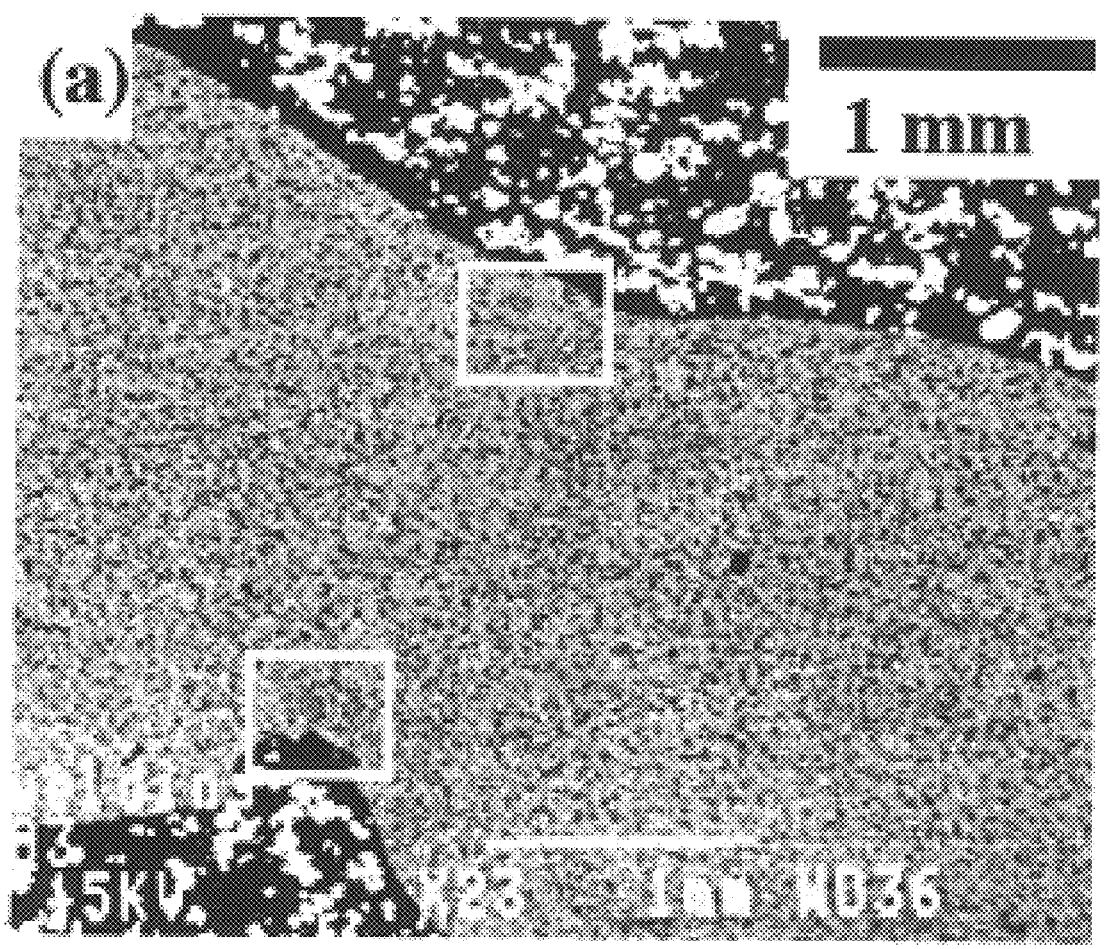
FIG. 1 shows a cross-section scanning electron micrograph (SEM) image of the melt zone of an x-ray weld, including the entire width of the sample.
Figure 2:
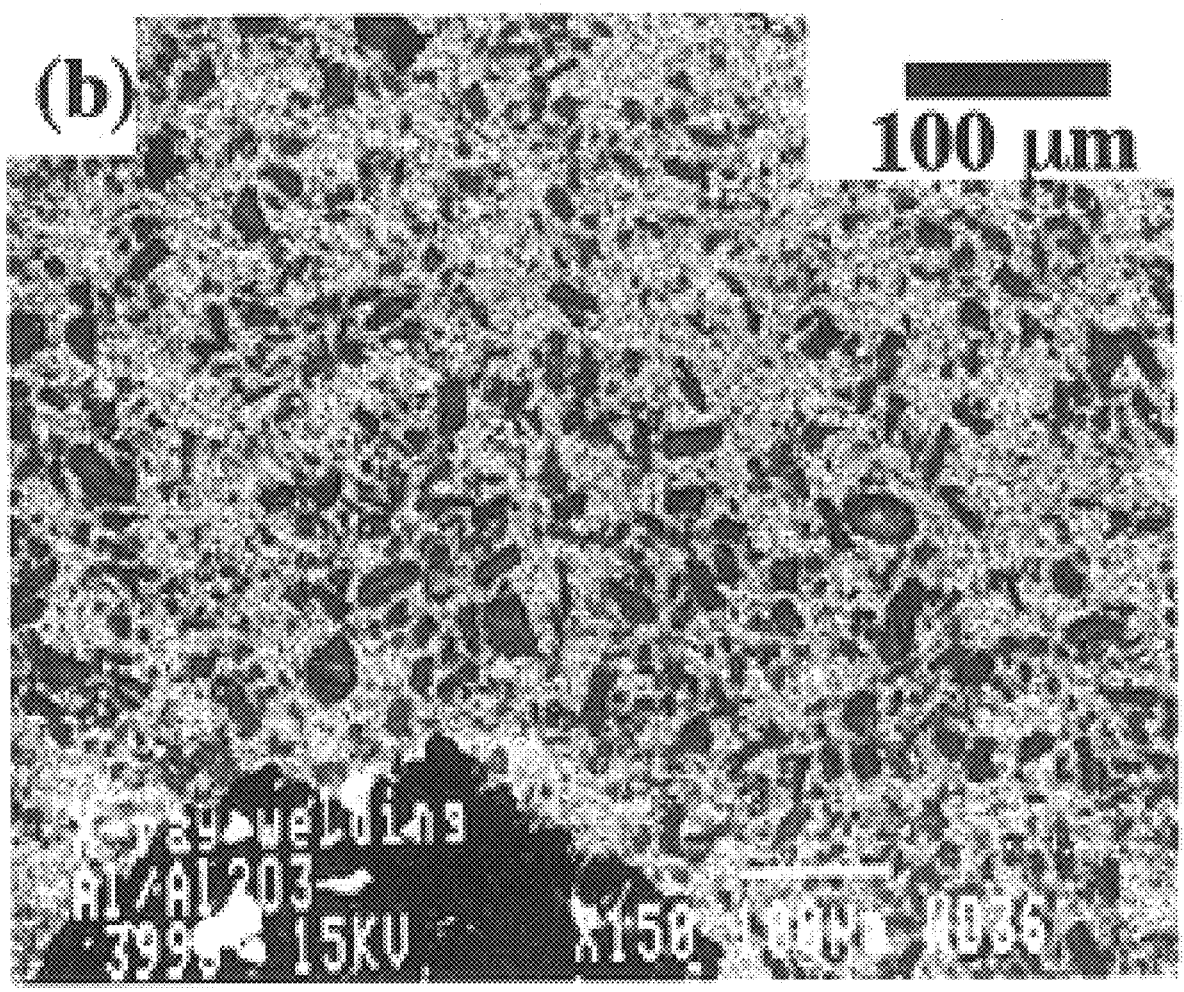
FIG. 2 shows a cross-section scanning electron micrograph (SEM) image of the melt zone of an x-ray weld, including an enlarged region of the area where the x-rays impinged on a sample metal-matrix composite.
Figure 3:
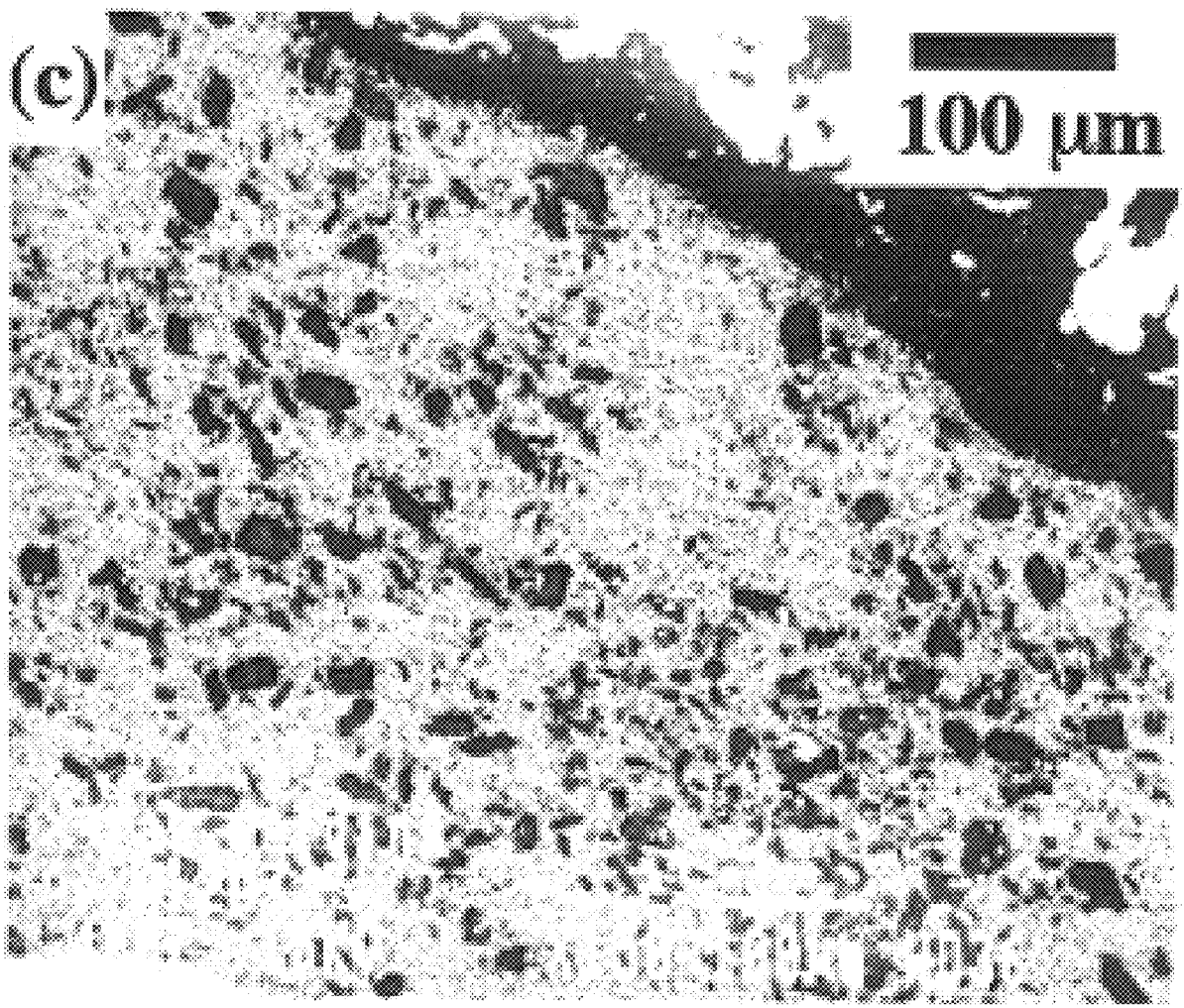
FIG. 3 shows a cross-section scanning electron micrograph (SEM) image of the melt zone of an x-ray weld, including an enlarged region of the area where the x-rays exited a sample metal-matrix composite.
Figure 4:
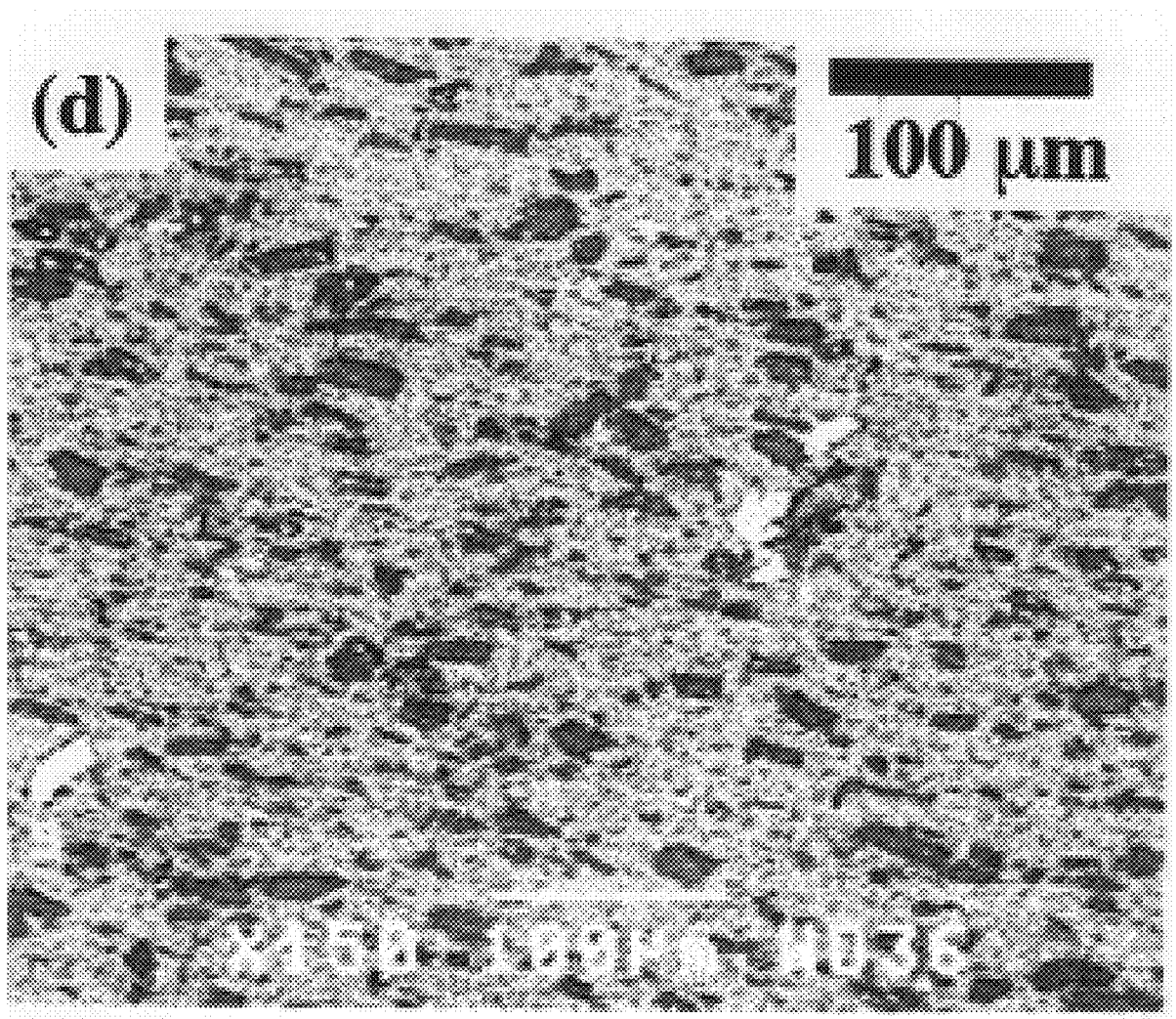
FIG. 4 shows a cross-section scanning electron micrograph (SEM) image of an unirradiated region of a metal matrix composite.

Welding trials were performed on the Al/Al$_2$O$_3$ MMC samples on beamline 1-ID with the undulator gap set to 11 mm, resulting in a peak heat flux of 170 W/mm$^2$ and a first harmonic energy of 3.5 ke V. A fixed mask limited the beam size to 2.5 mm horizontal and 1.0 mm vertical. Cross-section scanning electron micrograph (SEM) images of the melt zone irradiated for approximately 16 seconds at a storage ring beam current of 91 mA are shown in FIGS. 1–4. FIG. 1 shows the melt zone, indicating where x-rays were incident on the sample at the lower left and exited from the sample at the upper right. Although some vaporization of matrix material did occur, most of the material was still intact and, more importantly, the distribution of particulates stayed uniform. FIG. 2 shows an enlarged region of the area where the x-rays impinged on the sample, demonstrating that the density of particulates is even slightly higher in this region, which is most probably a result of selective vaporization of the Al matrix (T$_{vap}$=2467° C.), leaving behind an excess of $Al_2O_3$ particulates ($T_{vap}$=2980° C.). FIG. 3 shows an enlarged view of the region where the x-rays exited. In the exiting region, the distribution of the particles is uniform when compared to an unirradiated region, as shown in FIG. 4. These examples show that full penetration heating of a 3.3 mm thick sample by x-ray welding occurs with minimal disruption to metallurgical integrity.

Figure 5:
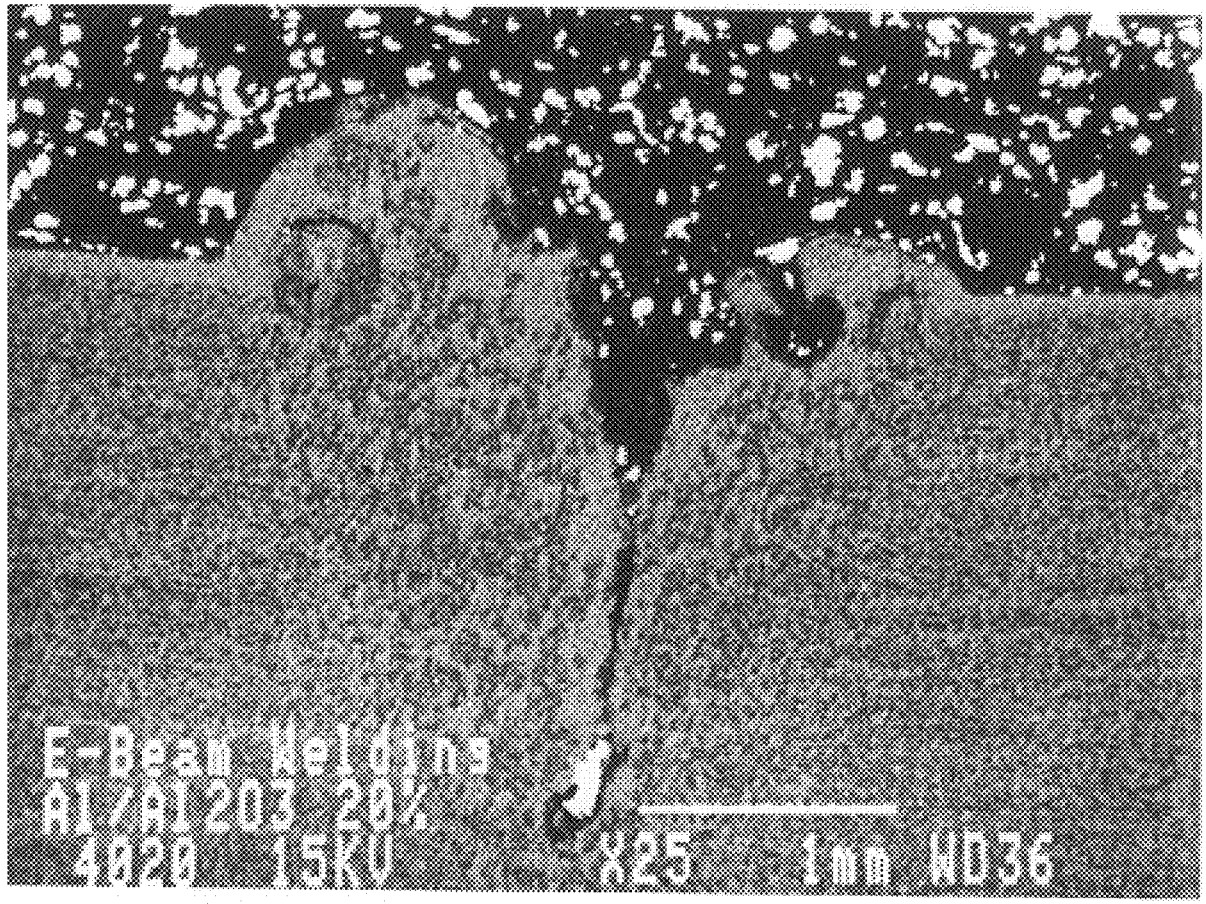
FIG. 5 shows a cross-section scanning electron micrograph (SEM) image of the melt zone of an electron beam weld of a sample metal-matrix composite.

Importantly, although melting occurred throughout the irradiated region, the reinforcing particulates were unperturbed. This is a significant improvement over the disruptive effect electron beam and laser sources have on the particulates, or other reinforcement material, of the metal-matrix composite, including violent vaporization and destruction of particulates, wherein the work piece was cut rather than fused. FIG. 5 shows an SEM micrograph of an electron-beam-welded MMC, including a very low density of reinforcing particulates in the vicinity of the melt zone and a crack extending nearly completely through the work piece. The low density of the reinforcing particulates is probably due to vaporization of the particulates or dissolution of the $Al_2O_3$ in the molten Al. Similar behavior has also been observed in laser welding of Al/SiC MMCs.

Also important is the total absence of cracks in the weld zones according to the present method, as illustrated in FIGS. 2–5. The matrix metal, 6061 Al, is known for solidification cracking when welded autogenously using conventional methods. The absence of cracks in the MMCs subjected to x-ray welding is probably because the volumetric heating results in relatively slow heating and cooling rates, decreasing strain on the material in the melt zone.

In an alternate embodiment, high power x-rays are used as a volumetric heat source for welding metal and/or metal alloy elements, such as aluminum 6061 and aluminum 7075, as opposed to metals matrices comprised of reinforcing materials. As in the MMC embodiment above, the x-ray beam has a power density of at least $10^4$ W/cm$^2$, a total power of at least 300 watts, and energies in the range of between about 2 keV and 200 keV. The x-ray beam is directed along the weld line formed by the juxtaposition of the structures to be welded, creating a melt zone. The structures are fused together as the x-ray beam causes melting along the weld line.

An additional significant advantage of x-ray welding is that the welding can be performed at atmospheric pressure. The MMC or metal or metal alloy surfaces to be joined are generally prepared by removing any oxide layer by filing or other means known in the art. An inert atmosphere may further be provided, by purging for example, in the work area containing the MMC or metal or metal alloys to be welded and wherein the welding is performed.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A method for x-ray welding metal-matrix composites, comprising:

provideing first and second metal-matrix composite elements, each element comprised of a metal having reinforcing material distributed therein;

positioning the first and second metal-matrix composite elements in close proximity one to the other, thereby forming a weld line; and directing a high energy density x-ray beam to the weld line to melt the matrices, thereby creating a melt zone comprising a weld joining the first and second metal-matrix composite elements, wherein the reinforcing materials of the first and second metal-matrix composite elements are uniformly distributed in the melt zone.

2. The method according to claim 1, further comprising the step of selecting the metals from a group consisting of aluminum, titanium, and magnesium.

3. The method according to claim 1, further comprising the step of selecting the reinforcing materials from a group consisting of silicon carbide, alumina, tungsten carbide, graphite, and boron carbide.

4. The method according to claim 1, further comprising the step of providing first and second metal-matrix composites comprised of aluminum having alumina particulates dispersed therein.

5. The method according to claim 1, wherein the x-ray beam has a power density of at least $10^4$ W/cm$^2$, a total power of at least 300 watts, and energies in the range of between about 2 keV and 200 keV.

6. The method according to claim 1, further comprising the step of removing an oxide layer from the surfaces of the first and second metal-matrix composite elements prior to directing the high energy density x-ray beam.

7. The method according to claim 6, further comprising the step of removing the oxide layer by filing.

8. The method according to claim 1, wherein the step of directing the high energy density x-ray beam further comprises directing an x-ray beam having a power density sufficient to weld a 3.3 mm thick MMC element in the range of between about 15 inches/minute to about 20 inches/minute.

9. The method according to claim 1, further comprising the step of providing an inert gas atmosphere.

10. The method according to claim 1, wherein the x-ray welding is conducted at atmospheric pressure.

11. The method according to claim 1, wherein the atmosphere surrounding the weld line is inert.

* * * * *